United States Patent
Tang

(10) Patent No.: US 11,419,094 B2
(45) Date of Patent: Aug. 16, 2022

(54) METHODS OF TRANSMITTING AND RECEIVING PAGING MESSAGE, ACCESS NETWORK EQUIPMENT, AND TERMINAL EQUIPMENT

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/316,251

(22) PCT Filed: Jul. 29, 2016

(86) PCT No.: PCT/CN2016/092361
§ 371 (c)(1),
(2) Date: Jan. 8, 2019

(87) PCT Pub. No.: WO2018/018622
PCT Pub. Date: Feb. 1, 2018

(65) Prior Publication Data
US 2019/0239192 A1      Aug. 1, 2019

(51) Int. Cl.
*H04W 68/02* (2009.01)
*H04W 16/28* (2009.01)
(Continued)

(52) U.S. Cl.
CPC .......... *H04W 68/06* (2013.01); *H04B 7/0695* (2013.01); *H04W 52/0216* (2013.01);
(Continued)

(58) Field of Classification Search
CPC ......... H04W 68/06; H04W 52/02; H04B 7/06
See application file for complete search history.

(56) References Cited

U.S. PATENT DOCUMENTS 6,229,989 B1    5/2001  Kwon
8,126,483 B2    2/2012  Lee
(Continued)

FOREIGN PATENT DOCUMENTS

CN    102281502 A    12/2011
CN    102625254 A    8/2012
(Continued)

OTHER PUBLICATIONS

International Search Report in international application No. PCT/CN2016/092361, dated May 4, 2017.
(Continued)

*Primary Examiner* — Jinsong Hu
*Assistant Examiner* — Farideh Madani
(74) *Attorney, Agent, or Firm* — Ladas & Parry LLP

(57) ABSTRACT

The invention provides methods of transmitting and receiving a paging message, access network equipment, and terminal device equipment. The method of transmitting a paging message comprises: access network equipment determines a paging message; the access network equipment determines a paging start time and a continuous paging transmission time interval; and the access network equipment transmits, by employing beam sweeping, and according to the paging start time and the continuous paging transmission time interval, the paging message. Therefore, the embodiment can enhance quality of receiving a paging message.

10 Claims, 5 Drawing Sheets

(51) Int. Cl.
*H04W 68/06* (2009.01)
*H04B 7/06* (2006.01)
*H04W 52/02* (2009.01)

(52) U.S. Cl.
CPC ............ *H04W 68/02* (2013.01); *H04W 16/28* (2013.01); *Y02D 30/70* (2020.08)

(56) References Cited

U.S. PATENT DOCUMENTS

| | | | |
|---|---|---|---|
| 8,218,468 | B2 | 7/2012 | Chin |
| 10,492,137 | B2* | 11/2019 | Kwon .................. H04W 76/28 |
| 2007/0099652 | A1* | 5/2007 | Lindoff ................ H04W 48/16 |
| | | | 455/552.1 |
| 2008/0014969 | A1 | 1/2008 | Laroia |
| 2010/0240420 | A1 | 9/2010 | Chin |
| 2013/0039255 | A1* | 2/2013 | Kim ........................ H04W 4/06 |
| | | | 370/312 |
| 2013/0324168 | A1 | 12/2013 | Ishii |
| 2014/0010141 | A1* | 1/2014 | Kim .................... H04W 68/005 |
| | | | 370/312 |
| 2014/0128109 | A1* | 5/2014 | Li ........................ H04W 68/02 |
| | | | 455/458 |
| 2015/0173039 | A1 | 6/2015 | Rune |
| 2016/0029343 | A1 | 1/2016 | Quan et al. |
| 2016/0119895 | A1 | 4/2016 | Agiwal et al. |
| 2017/0094599 | A1* | 3/2017 | Eskelinen ......... H04W 52/0212 |
| 2017/0099126 | A1* | 4/2017 | Yoo ....................... H04L 5/0048 |
| 2018/0115361 | A1* | 4/2018 | Li ....................... H04W 72/046 |
| 2018/0338281 | A1* | 11/2018 | Bangolae .......... H04W 52/0216 |

FOREIGN PATENT DOCUMENTS

| | | |
|---|---|---|
| CN | 102843768 A | 12/2012 |
| CN | 102917444 A | 2/2013 |
| CN | 102970750 A | 3/2013 |
| CN | 102979759 A | 3/2013 |
| CN | 103945503 A | 7/2014 |
| CN | 104350795 A | 2/2015 |
| CN | 104919872 A | 9/2015 |
| JP | 2009544244 A | 12/2009 |
| JP | 2015515816 A | 5/2015 |
| KR | 101054547 B1 | 8/2011 |
| RU | 2183909 C2 | 6/2002 |
| RU | 2275742 C2 | 4/2006 |
| WO | 2015098746 A1 | 7/2015 |
| WO | 2018118061 A1 | 6/2018 |

OTHER PUBLICATIONS

Written Opinion of the International Search Authority in international application No. PCT/CN2016/092361, dated May 4, 2017.
Supplementary European Search Report in European application No. 16910202.7, dated Mar. 14, 2019.
English Translation of the Written Opinion of the international Search Authority in international application No. PCT/CN2016/092361, dated May 4, 2017.
First Office Action of the Russian application No. 2019105084, dated Oct. 10, 2019.
First Office Action in corresponding Chinese application No. 201680087963.7, dated Mar. 5, 2020.
Notice of Allowance in corresponding Russian application No. 2019105084, dated Jan. 16, 2020.
First Office Action in corresponding Canadian application No. 3032212, dated Jan. 24, 2020.
Written Opinion in corresponding Singaporean application No. 11201900770W, dated Mar. 20, 2020.
Notice of Allowance of the South African application No. 2019/01217, dated Oct. 1, 2019.
3GPP TS 36.331 V13.0.0 (Dec. 2015), 3rd Generation Partnership Project;Technical Specification Group Radio Access Network;Evolved Universal Terrestrial Radio Access (E-UTRA); Radio Resource Control (RRC);Protocol specification (Release 13).
3GPP TS 36.304 V13.0.0 (Dec. 2015), 3rd Generation Partnership Project;Technical Specification Group Radio Access Network;Evolved Universal Terrestrial Radio Access (E-UTRA); User Equipment (UE) procedures in idle mode (Release 13).
Notice of Rejection of the Chinese application No. 201680087963.7, dated Sep. 9, 2020.
Oral Examination of the European application No. 16910202.7, dated May 19, 2021.
Office Action of the Australian application No. 2616416776, dated May 3, 2021.
Second Written Opinion of the Singaporean application No. 11201900770W, dated Mar. 16, 2021.
Notice of Allowance of the Chinese application No. 201680087963.7, dated May 6, 2021.
Office Action of the Taiwanese application No. 106123099, dated May 18, 2021.
First Office Action of the European application No. 16910202.7, dated Nov. 8, 2019,.
Second Office Action of the Japanese application No. 2019-503559, dated Jan. 29, 2021.
Third Office Action of the European application No. 16910202.7, dated Oct. 15, 2020.
Second Office Action of the Canadian application No. 3032212, dated Nov. 30, 2020.
Second Oral Examination of the European application No. 16910202.7, dated Sep. 10, 2021.
Decision of Refusal of the Japanese application No. 2019-503559, dated Sep. 24, 2021.
Third Office Action of the Canadian application No. 3032212, dated Sep. 23, 2021.
Notice of Rejection of the European application No. 16910202.7, dated Feb. 17, 2022.
First Office Action of the Mexican application No. MX/a/2019/001204, dated Mar. 29, 2022.
Second Office Action of the Chinese application No. 201680087963.7, dated Jun. 3, 2020.
Second Office Action of the European application No. 16910202.7, dated Jun. 8, 2020.
First Office Action of the Japanese application No. 2019-503559, dated Jun. 23, 2020.
First Office Action of the Indian application No. 201917006480, dated Aug. 13, 2020.
First Office Action of the Korean application No. 10-2019-7005342, dated Apr. 30, 2022.
Fourth Office Action of the Canadian application No. 3032212, dated May 18, 2022.

\* cited by examiner

METHODS OF TRANSMITTING AND RECEIVING PAGING MESSAGE, ACCESS NETWORK EQUIPMENT, AND TERMINAL EQUIPMENT

RELATED APPLICATION

This application is an application under 35 U.S.C. 371 of International Application No. PCT/CN2016/092361 filed on Jul. 29, 2016, the entire contents of which are incorporated herein by reference.

TECHNICAL FIELD

Embodiments of the disclosure relate to the field of communication, and more particularly to methods for transmitting and receiving a paging message, an access network device and a terminal device.

BACKGROUND

Paging is a signaling flow of looking for a use equipment (UE) in a network. In order to perform normal communication, a called terminal device in the network is required to give a response to the paging. For reducing a signaling load, there are three paging triggering conditions in a Long Term Evolution (LTE) network: a UE being called (by a Mobility Management Entity (MME)), change of a system message (which is initiated by an Evolved Node B (eNB)) and an Earthquake and Tsunami Warning System (Etws).

In the existing LTE network, a paging process is implemented by virtue of Timing Advance (TA). Paging is implemented in a Tracking Area Code (TAC), a paging message is transmitted in all orientations in the TAC and a terminal may receive the paging message at any orientation of the TAC. High frequency bands (higher than 6 GHz) may be introduced into a future communication system. In terms of high-frequency-band access, path loss is directly proportional to a frequency conversion square, and thus relatively greater loss may be generated in a relatively short distance at a high frequency band. A method for transmitting a paging message for the existing LTE network is relatively low in the receiving quality of the paging message.

SUMMARY

The application provides methods for transmitting and receiving a paging message, an access network device and a terminal device, which may improve the receiving quality of the paging message.

A first aspect provides a method for transmitting a paging message, which may include that: an access network device determines a paging message; the access network device determines a paging starting moment and a paging transmitting duration; and the access network device transmits the paging message to a terminal device in a manner of beam scanning according to the paging starting moment and the paging transmitting duration.

Therefore, according to the method for transmitting a paging message according to the embodiments of the application, the access network device transmits the paging message to the terminal device in the manner of beam scanning, which may improve the receiving quality of the paging message.

In combination with the first aspect, in a first possible implementation mode of the first aspect, the operation that the access network device determines the paging starting moment and the paging transmitting duration may include that: the access network device determines the paging starting moment and the paging transmitting duration according to a paging cycle of the terminal device.

In combination with the first possible implementation mode of the first aspect, in a second possible implementation mode of the first aspect, the paging cycle may include a first period and a second period, the first period may be a period in which the terminal device continuously listens for the paging message, the second period may be a period in which the terminal device is in a sleep state; and the operation that the access network device determines the paging transmitting duration according to the paging cycle of the terminal device may include that: the access network device determines a value less than or equal to a duration of the first period as the paging transmitting duration.

In combination with the second possible implementation mode of the first aspect, in a third possible implementation mode of the first aspect, before the operation that the access network device determines the paging starting moment and the paging transmitting duration, the method may further include that: the access network device receives a first message from a core network device, the first message including information configured to indicate the duration of the first period.

In combination with the second possible implementation mode of the first aspect, in a fourth possible implementation mode of the first aspect, the method may further include that: the access network device transmits a second message to the core network device, the second message including the information configured to indicate the duration of the first period.

In combination with any possible implementation mode in the second to fourth possible implementation modes of the first aspect, in a fifth possible implementation mode of the first aspect, the paging cycle may be N times the duration of the first period, N being a positive integer larger than 1.

In combination with any possible implementation mode in the second to fifth possible implementation modes of the first aspect, in a sixth possible implementation mode of the first aspect, before the operation that the access network device transmits the paging message to the terminal device in the manner of beam scanning according to the paging starting moment and the paging transmitting duration, the method may further include that: the access network device determines the number of paging beams needed for transmitting of the paging message to be M according to the duration of the first period, M being a positive integer more than or equal to 1.

In combination with any possible implementation mode in the second to fifth possible implementation modes of the first aspect, in a seventh possible implementation mode of the first aspect, the operation that the access network device transmits the paging message to the terminal device in the manner of beam scanning according to the paging starting moment and the paging transmitting duration. The method may include that: at the paging starting moment, the access network device starts transmitting the paging message to the terminal device in the manner of beam scanning by means of L paging beams, any two of the L paging beams corresponding to different paging transmitting durations and L being a positive integer more than or equal to 2.

In combination with the seventh possible implementation mode of the first aspect, in an eighth possible implementation mode of the first aspect, a value of L may be 2, a paging transmitting duration corresponding to one of the two paging beams may be a cell-specific continuous listening duration of a cell where the terminal device is located or a preset duration and a paging transmitting duration corresponding to another of the two paging beams may be a terminal device specific continuous listening duration of the terminal device.

In combination with any possible implementation mode in the second to eighth possible implementation modes of the first aspect, in a ninth possible implementation mode of the first aspect, the access network device may transmit a system message to the terminal device, the system message including the information configured to indicate the duration of the first period.

In combination with the first aspect or any possible implementation mode in the first to ninth possible implementation modes of the first aspect, in a tenth possible implementation mode of the first aspect, the method may further include that: when the access network device receives a response message configured to indicate that the paging message is successfully received from the terminal device, the access network device stops transmitting the paging message to the terminal device.

A second aspect provides a method for receiving a paging message, which may include that: terminal device determines a paging starting moment and a paging receiving duration; and the terminal device receives a paging message according to the paging starting moment and the paging receiving duration.

Therefore, according to the method for receiving a paging message according to the embodiments of the application, the terminal device receives the paging message according to the determined paging starting moment and paging receiving duration, which may improve the receiving quality of the paging message.

In combination with the second aspect, in a first possible implementation mode of the second aspect, the paging message may be transmitted by an access network device in a manner of beam scanning according to the paging starting moment and the paging transmitting duration, and the paging receiving duration may be more than or equal to the paging transmitting duration.

Since the paging message is transmitted by the access network device in the manner of beam scanning, the receiving quality of the paging message may further be improved.

In combination with the second aspect or the first possible implementation mode of the second aspect, in a second possible implementation mode of the second aspect, the operation that the terminal device determines the paging starting moment and the paging receiving duration, the method may include that: the terminal device determines the paging starting moment and the paging receiving duration according to a paging cycle of the terminal device.

In combination with the second possible implementation mode of the second aspect, in a third possible implementation mode of the second aspect, the paging cycle may include a first period and a second period, the first period may be a period in which the terminal device continuously listens for the paging message, the second period may be a period in which the terminal device is in a sleep state, and the operation that the terminal device determines the paging receiving duration according to the paging cycle of the terminal device may include that: the terminal device determines a duration of the first period as the paging receiving duration.

In combination with the third possible implementation mode of the second aspect, in a fourth possible implementation mode of the second aspect, the operation that the terminal device receives the paging message according to the paging starting moment and the paging receiving duration, the method may include that: at the paging starting moment, the terminal device starts a first timer, and simultaneously starts continuously listening for the paging message in the first period, a timing period of the first timer being the paging cycle; if the paging message is not heard by the terminal device in the first period, the terminal device enters the sleep state; and responsive to determining, by the terminal device, timeout of the first timer, the terminal device restarts continuously listening for the paging message.

In combination with the third possible implementation mode of the second aspect, in a fifth possible implementation mode of the second aspect, the operation that the terminal device receives the paging message according to the paging starting moment and the paging receiving duration, the method may include that: the terminal device continuously listens for the paging message in the first period from the paging starting moment; if the paging message is not heard by the terminal device in the first period, at an ending moment of the first period, the terminal device starts a second timer, and simultaneously enters the sleep state, a timing period of the second timer being a duration of the second period; and responsive to determining, by the terminal device, timeout of the second timer, the terminal device restarts continuously listening for the paging message.

In combination with any possible implementation mode in the third to fifth possible implementation modes of the second aspect, in a sixth possible implementation mode of the second aspect, the paging cycle may be N times the duration of the first period, N being a positive integer larger than 1.

In combination with any possible implementation mode in the third to sixth possible implementation modes of the second aspect, in a seventh possible implementation mode of the second aspect, the paging message may be started to be transmitted by the access network device from the paging starting moment in the manner of beam scanning by means of L paging beams, any two of the L paging beams may correspond to different paging transmitting durations, and the duration of the first period may be more than or equal to a maximum value of paging transmitting durations corresponding to the L paging beams, L being a positive integer more than or equal to 2.

In combination with the seventh possible implementation mode of the second aspect, in an eighth possible implementation mode of the second aspect, a value of L may be 2, a paging transmitting duration corresponding to one of the two paging beams may be a cell-specific continuous listening duration of a cell where the terminal device is located or a preset duration, and a paging transmitting duration corresponding to another of the two paging beams may be a terminal device specific continuous listening duration of the terminal device.

In combination with any possible implementation mode in the third to eighth possible implementation modes of the second aspect, in a ninth possible implementation mode of the second aspect, the method may further include that: the terminal device receives a system message from the access network device, the system message including information configured to indicate the duration of the first period.

In combination with any possible implementation mode in the first to ninth possible implementation modes of the second aspect, in a tenth possible implementation mode of the second aspect, the method may further include that: the terminal device transmits a response message configured to indicate that the paging message is successfully received to the access network device; and when the terminal device receives an acknowledgment message for the response message from the access network device, the terminal device starts a third timer and simultaneously enters the sleep state, or at a moment of K time units after the acknowledgment message is received, the terminal device starts the third timer, and simultaneously enters the sleep state, K being a positive integer more than or equal to 1.

A third aspect provides an access network device, which is configured to execute the method in the first aspect or any possible implementation mode of the first aspect. Specifically, the access network device includes functional modules configured to execute the method in the first aspect or any possible implementation mode of the first aspect.

A fourth aspect provides a terminal device, which is configured to execute the method in the second aspect or any possible implementation mode of the second aspect. Specifically, the terminal device includes functional modules configured to execute the method in the second aspect or any possible implementation mode of the second aspect.

A fifth aspect provides an access network device, which includes a processor, a memory and a transceiver. The processor, the memory and the transceiver are connected through a bus system. The memory is configured to store an instruction. The processor is configured to execute the instruction stored in the memory to control the transceiver to receive information or transmit information to enable the access network device to execute the method in the first aspect or any possible implementation mode of the first aspect.

A sixth aspect provides a terminal device, which includes a processor, a memory and a transceiver. The processor, the memory and the transceiver are connected through a bus system. The memory is configured to store an instruction. The processor is configured to execute the instruction stored in the memory to control the transceiver to receive information or transmit information to enable the terminal device to execute the method in the second aspect or any possible implementation mode of the second aspect.

A seventh aspect provides a computer-readable medium, which is configured to store a computer program, the computer program including instructions configured to execute the method in the first aspect or any possible implementation mode of the first aspect.

An eighth aspect provides a computer-readable medium, which is configured to store a computer program, the computer program including instructions configured to execute the method in the second aspect or any possible implementation mode of the second aspect.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a 5th Generation (5G) system or a New Radio (NR) system.

In the embodiments of the disclosure, terms "network" and "system" are often used alternately and their meanings may be understood by those skilled in the art. The terminal device involved in the embodiments of the disclosure may include various handheld devices, vehicle-mounted devices, wearable devices, computing devices or other processing devices connected to wireless modems, which have a wireless communication function, as well as UEs, Mobile Stations (MSs), terminals, terminal devices and the like in various forms. For convenient description, the devices mentioned above are collectively referred to as terminal devices in the embodiments of the disclosure.

An access network device involved in the embodiments of the disclosure is a device deployed in a radio access network to provide a wireless communication function for the terminal device. The access network device may be an eNB and the eNB may include a macro eNB, a micro eNB, a relay station, an access point and the like. In systems with different radio access technologies, a device with an eNB function may have different names. For example, it is called an eNB or eNodeB in an LTE network and is called a Node B in a 3rd Generation (3G) network, etc.

Figure 1:
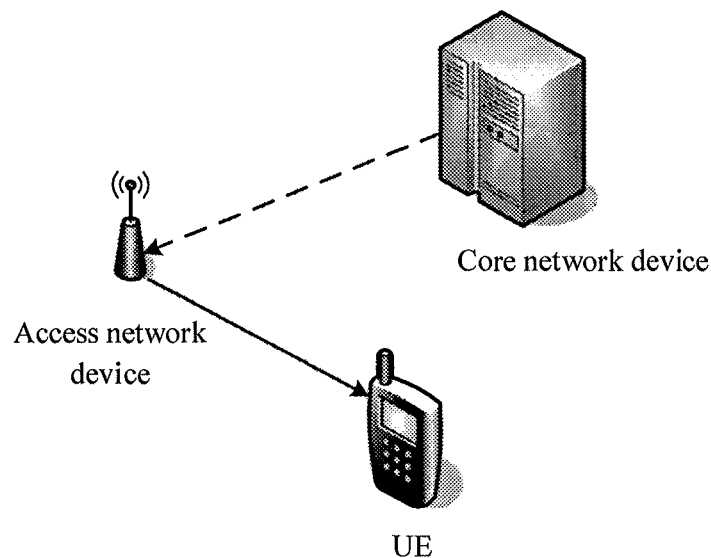
FIG. 1 illustrates a schematic diagram of an application scenario according to an embodiment of the disclosure.

FIG. 1 is a diagram of an application scenario according to an embodiment of the disclosure. As illustrated in FIG. 1, an access network device may transmit a paging message to terminal device. The access network device usually sends the paging message to the terminal device under three triggering conditions, i.e., the terminal device being called (triggered by a core network device, for example, an MME), change of a system message (triggered by the access network device) and an Earthquake and Tsunami Warning System (Etws).

When the access network device transmits the paging message to the terminal device, paging contents of the terminal device with the same paging occasion are collected in the same paging message, and the contents of the paging message are mapped into a logical channel, i.e., a Paging Control Channel (PCCH) and are transmitted to the terminal device on a Physical Downlink Shared Channel (PDSCH) according to a Discontinuous Reception (DRX) period of the terminal device. Correspondingly, the terminal device detects a Physical Downlink Control Channel (PDCCH) according to the DRX period to check whether there is a paging message or not. If the PDCCH indicates that there is a paging message, the terminal device determines whether the paging message is directed to the terminal device itself or not. If YES, the terminal device receives the paging message.

Figure 2:
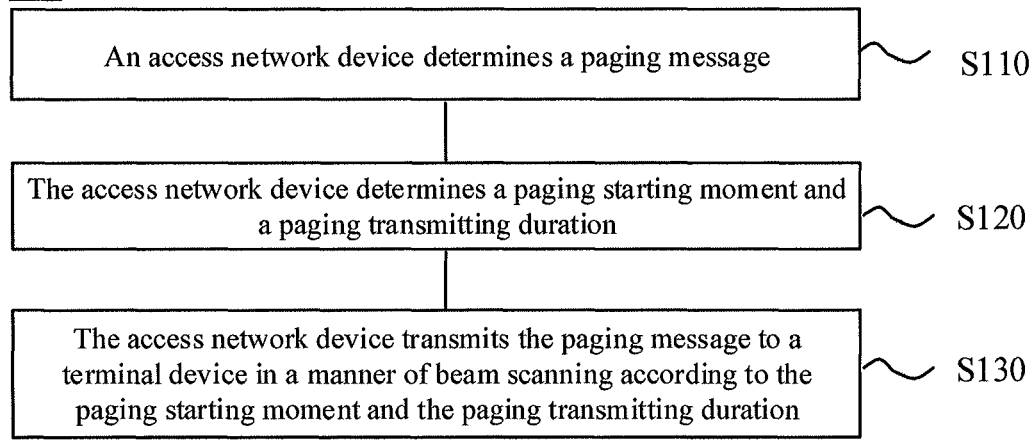
FIG. 2 illustrates a schematic flowchart of a method for transmitting a paging message according to an embodiment of the disclosure.

FIG. 2 illustrates a schematic flowchart of a method for transmitting a paging message according to an embodiment of the disclosure. As illustrated in FIG. 2, the method 100 includes the following operations.

In S110, an access network device determines a paging message.

In S120, the access network device determines a paging starting moment and a paging transmitting duration.

In S130, the access network device transmits the paging message to a terminal device in a manner of beam scanning according to the paging starting moment and the paging transmitting duration.

Therefore, according to the method for transmitting a paging message according to the embodiments of the disclosure, the access network device transmits the paging message to the terminal device in the manner of beam scanning, which may improve the receiving quality of the paging message.

It can be understood that the paging transmitting duration is a scanning duration of a paging beam configured to transmit the paging message.

Specifically, the operation in S110 that the access network device determines the paging message may be implemented as follows. The access network device receives the paging message from an MME and the access network device determines the received paging message as the paging message to be transmitted to the terminal device. Or, when a system message is changed, the access network device generates the paging message to be transmitted to the terminal device.

Figure 3:
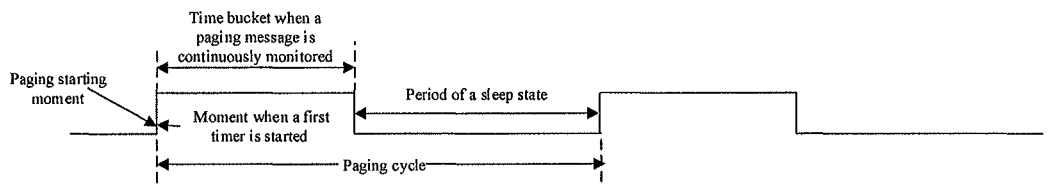
FIG. 3 illustrates a schematic diagram of a paging cycle of a terminal device according to an embodiment of the disclosure.

Alternatively, as an example, the access network device determines the paging starting moment and the paging transmitting duration according to a paging cycle of the terminal device. As illustrated in FIG. 3, the paging cycle of the terminal device includes a first period and a second period. The first period is a period in which the terminal device continuously listens for the paging message. The second period is a period in which the terminal device is in a sleep state. The access network device determines a value less than or equal to a duration of the first period as the paging transmitting duration. That is, the access network device is required to ensure that the scanning duration of the paging beam is less than or equal to the duration when the terminal device continuously listens for the paging message.

Alternatively, as an example, the access network device may determine the paging starting moment is in a manner described as a formula (1):

$$\text{SFN} \bmod T = (T \text{ div } N) * (UE\_ID \bmod N) \qquad (1),$$

where SFN represents a system frame number, i.e., a frame number of a radio frame where the UE is presently located; T represents the paging cycle of the terminal device; N: N=min(T, nB), nB represents a paging density; and UE_ID is included in the paging message, UE_ID is equal to International Mobile Subscriber Identification Number (IMSI) mod 1024, div represents a division operation and mod represents a remainder calculation operation.

It can be understood that a time unit in the embodiment of the disclosure is a radio frame, but the disclosure is not limited thereto and the time unit may also be another value.

As an alternative example, before S120, the access network device receives a first message from a core network device, the first message including information configured to indicate the duration of the first period. Therefore, the access network device may determine a paging duration according to the duration T' of the first period. In this example, T' is determined by the core network device. The core network device may determine T' according to information of the terminal device. For example, the core network device may determine T' according to an attribute of a service initiated by the terminal device.

Alternatively, as an example, the access network device determines T' on the basis of implementation of the access network device. Then, the access network device transmits a second message to the core network device, the second message including the information configured to indicate T'. It can be understood that, in this example, the core network device determines the paging cycle T of the terminal device according to T' determined by the access network device and ensures that the paging cycle T of the terminal device is not shorter than T'. If multiple access network devices transmit different T's to the core network device, the core network device, when determining the paging cycle T of the terminal device, adopts the T' with a maximum value.

Furthermore, the paging cycle T of the terminal device may be N times the duration of the first period, N being a positive integer larger than 1. Or it is expressed that T is an integral multiple of T'.

Figure 4:
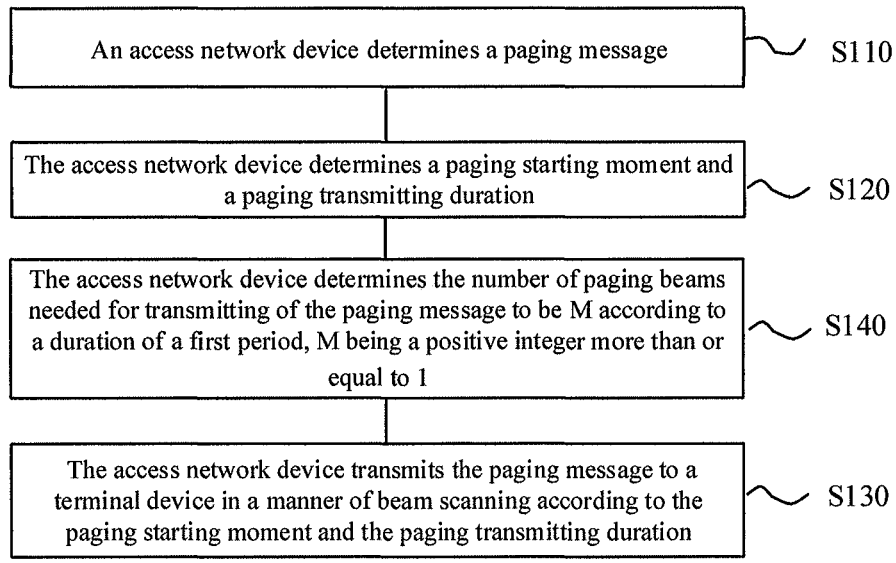
FIG. 4 illustrates another schematic flowchart of a method for transmitting a paging message according to an embodiment of the disclosure.

In the embodiment, alternatively, as illustrated in FIG. 4, before S130, the method 100 further includes the following operation.

In S140, the access network device determines the number of paging beams needed for transmitting of the paging message to be M according to the duration of the first period, M being a positive integer more than or equal to 1.

In other words, the access network device, after determining T', determines the number of the paging beams needed for transmitting of the paging message according to T' so as to ensure complete scanning of the paging beams in a coverage area of the access network device in T'.

Figure 5:
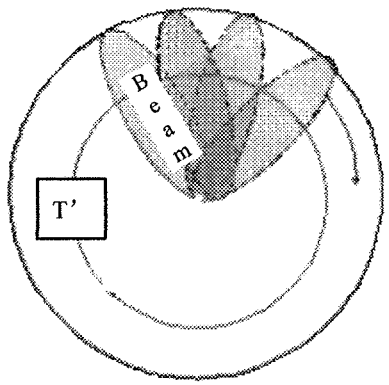
FIG. 5 illustrates a schematic diagram of a manner of beam scanning according to an embodiment of the disclosure.

For example, if the access network device determines to transmit the paging message to the terminal device in the manner of beam scanning by means of a single paging beam, the access network device may scan in a single direction and, for example, may scan clockwise or counterclockwise, for example, as illustrated in FIG. 5.

Figure 6:
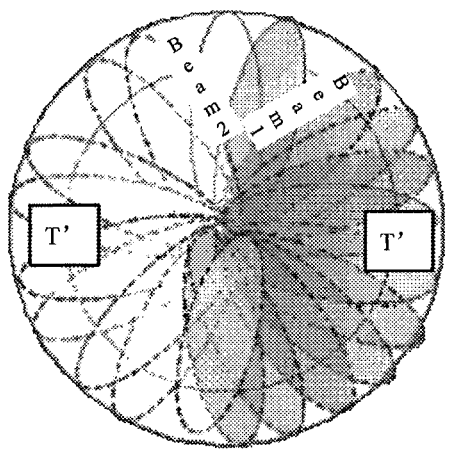
FIG. 6 illustrates a schematic diagram of a manner of beam scanning according to another embodiment of the disclosure.

Or, if the access network device transmits the paging message to the terminal device in the manner of beam scanning by means of multiple beams, for example, as illustrated in FIG. 6, the access network device transmits the paging message to the terminal device in the manner of beam scanning by means of two beams, the access network device scans with the two beams in opposite directions. Or, if the access network device determines to transmit the paging message to the terminal device in the manner of beam scanning by means of three beams, the access network device may use the three beams of which any two form an angle of 120 degrees to scan in a single direction, for example, scanning clockwise or counterclockwise.

Alternatively, as an embodiment, at the paging starting moment, the access network device starts transmitting the paging message to the terminal device in the manner of beam scanning by means of L paging beams, any two of the L paging beams corresponding to different paging transmitting durations and L being a positive integer more than or equal to 2. Each beam in the L beams may scan only part of area of the coverage area of the access network device.

Furthermore, alternatively, a value of L is 2, a paging transmitting duration corresponding to one of the two paging beams is a cell-specific continuous listening duration of a cell where the terminal device is located or a preset duration, and a paging transmitting duration corresponding to another of the two paging beams is a terminal device specific continuous listening duration of the terminal device. In this example, the cell-specific continuous listening duration may be determined on the basis of implementation of the access network device. The preset duration may be specified by a protocol. The terminal device specific continuous listening duration may be determined by the core network device on the basis of the information of the terminal device. The terminal device specific continuous listening duration may also be determined by the access network device.

Alternatively, as an example, the access network device transmits a system message to the terminal device, the system message including the information configured to indicate the duration of the first period. Or it can be understood that the duration of the first period may be configured for the terminal device through system information. Or, the access network device may configure the duration of the first period for the terminal device when negotiating with the terminal device about a DRX period.

In the embodiment, alternatively, when the access network device receives from the terminal device a response message configured to indicate that the paging message is successfully received, the access network device stops transmitting the paging message to the terminal device. For example, after the terminal device successfully receives the paging message, the terminal device initiates an access process to respond to the paging message and the access network device, after receiving an indication of a paging response of the terminal device, stops transmitting the paging message. Moreover, it can be understood that, if the paging message includes paging messages for multiple pieces of terminal device, the access network device stops transmitting the paging message only after receiving response messages of all the terminal device.

Figure 7:
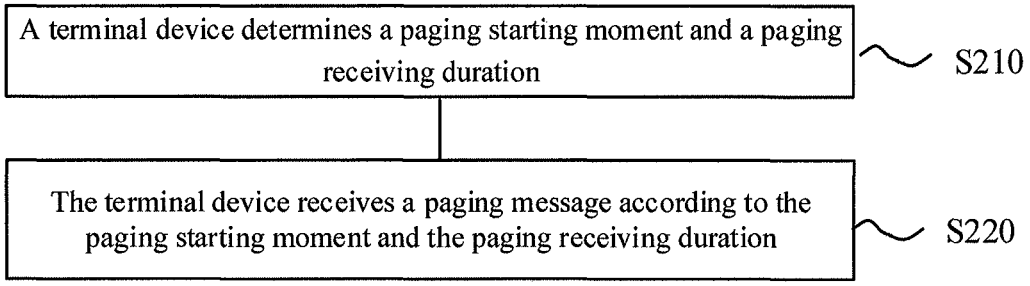
FIG. 7 illustrates a schematic flowchart of a method for receiving a paging message according to an embodiment of the disclosure.

The method for transmitting a paging message according to the embodiments of the disclosure is described above from an access network device side in combination with FIG. 2 to FIG. 6 in detail. A method for receiving a paging message according to the embodiments of the disclosure will be described below from a terminal device side in combination with FIG. 7 to FIG. 9 in detail. As illustrated in FIG. 7, the method 200 includes S210 and S220.

In S210, terminal device determines a paging starting moment and a paging receiving duration.

In S220, the terminal device receives a paging message according to the paging starting moment and the paging receiving duration.

Therefore, according to the method for receiving a paging message according to the embodiments of the disclosure, the terminal device receives the paging message according to the paging starting moment and the paging receiving duration, which may improve the receiving quality of the paging message.

In the embodiment of the disclosure, alternatively, the paging message is transmitted by an access network device in a manner of beam scanning according to the paging starting moment and a paging transmitting duration, and the paging receiving duration is more than or equal to the paging transmitting duration. Since the paging message is transmitted by the access network device in the manner of beam scanning, the receiving quality of the paging message may further be improved.

In the embodiment of the disclosure, alternatively, the operation that the terminal device determines the paging starting moment and the paging receiving duration includes that: the terminal device determines the paging starting moment and the paging receiving duration according to a paging cycle of the terminal device.

In the embodiment of the disclosure, alternatively, the paging cycle includes a first period and a second period. The first period is a period in which the terminal device continuously listens for the paging message. The second period is a period in which the terminal device is in a sleep state.

The operation that the terminal device determines the paging receiving duration according to the paging cycle of the terminal device includes that, the terminal device determines a duration of the first period as the paging receiving duration.

Alternatively, the terminal device may use a manner described as a formula (2) to determine the paging starting moment ts:

$$\text{SFN mod } T = (T \text{ div } N) * (UE\_ID \text{ mod } N) \quad (2),$$

where SFN represents a system frame number, i.e., a frame number of a radio frame where the UE is presently located; T represents the paging cycle of the UE, and the access network device may broadcast this parameter to the terminal device through a System Information Block 2 (SIB2); N: N=min(T, nB), nB represents a paging density and the terminal device reads nB from the SIB2; and UE_ID is included in the paging message, UE_ID is equal to IMSI mod 1024, div represents a division operation and mod represents a remainder calculation operation.

It can be understood that a time unit in the embodiment of the disclosure is a radio frame, but the disclosure is not limited thereto and the time unit may also be another value.

In the embodiment of the disclosure, alternatively, as illustrated in FIG. 3, the operation that the terminal device receives the paging message according to the paging starting moment and the paging receiving duration includes that: at the paging starting moment, the terminal device starts a first timer, and simultaneously starts continuously listening for the paging message in the first period, a timing period of the first timer being the paging cycle; if the paging message is not heard by the terminal device in the first period, the terminal device enters the sleep state; and responsive to determining, by the terminal device, timeout of the first timer, the terminal device restarts continuously listening for the paging message.

Figure 8:
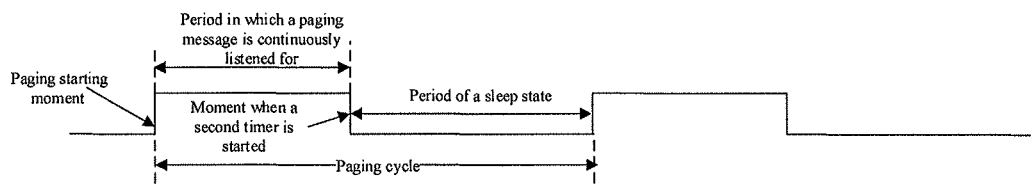
FIG. 8 illustrates a schematic diagram of a method for receiving a paging message for a terminal device according to another embodiment of the disclosure.

In the embodiment of the disclosure, alternatively, as illustrated in FIG. 8, the operation that the terminal device receives the paging message according to the paging starting moment and the paging receiving duration includes that: the terminal device continuously listens for the paging message in the first period from the paging starting moment; if the paging message is not heard by the terminal device in the first period, at an ending moment of the first period, the terminal device starts a second timer, and simultaneously enters the sleep state, a timing period of the second timer being a duration of the second period; and responsive to determining, by the terminal device, timeout of the second timer, the terminal device restarts continuously listening for the paging message.

In other words, the terminal device wakes up at the paging starting moment and starts listening for the paging message. When a listening duration is the duration corresponding to the first period, the terminal device enters the sleep state, and simultaneously starts a timer. In case of timeout of the timer, the terminal device wakes up again to monitor the paging message.

In the embodiment of the disclosure, alternatively, the paging cycle is N times the duration of the first period, N being a positive integer larger than 1.

In the embodiment of the disclosure, alternatively, the paging message is started to be transmitted by the access network device from the paging starting moment in the manner of beam scanning by means of L paging beams, any two of the L paging beams correspond to different paging transmitting durations and the duration of the first period is more than or equal to a maximum value of paging transmitting durations corresponding to the L paging beams, L being a positive integer more than or equal to 2.

That is, if the access network device transmits the paging message by means of multiple paging beams, and the multiple beams correspond to different paging transmitting durations, the terminal device receives the paging message according to a maximum value of the paging transmitting durations corresponding to the multiple paging beams and, once the terminal device correctly receives the paging message, the terminal device stops receiving the paging message.

In the embodiment of the disclosure, alternatively, a value of L is 2, a paging transmitting duration corresponding to one of the two paging beams is a cell-specific continuous listening duration of a cell where the terminal device is located or a preset duration, and a paging transmitting duration corresponding to another of the two paging beams is a terminal device specific continuous listening duration of the terminal device.

In the embodiment of the disclosure, alternatively, the terminal device receives a system message from the access network device, the system message including information configured to indicate the duration of the first period.

Figure 9:
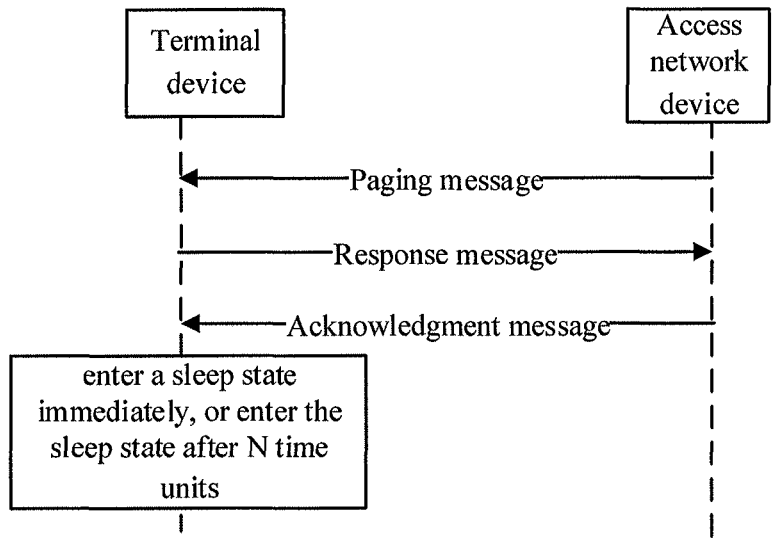
FIG. 9 illustrates a schematic diagram of a method for receiving a paging message for a terminal device according to yet another embodiment of the disclosure.

In the embodiment of the disclosure, alternatively, as illustrated in FIG. 9, when the terminal device successfully receives the paging message from the access network device, the terminal device transmits a response message configured to indicate that the paging message is successfully received to the access network device. When the terminal device receives an acknowledgment message for the response message from the access network device, the terminal device starts a third timer and simultaneously enters the sleep state, or at a moment of K time units after the acknowledgment message is received, the terminal device starts the third timer, and simultaneously enters the sleep state, K being a positive integer more than or equal to 1.

As an example, a numerical value of N may be predetermined in a protocol or configured for the terminal device by the access network device, and a timing period of the third timer may be specified in the protocol or configured for the terminal device by the access network device. In such a manner, after the terminal device receives the paging message of the access network device and if there is downlink data to be received or uplink data required to be transmitted, the terminal device may enter the sleep state after completely receiving the downlink data or completely transmitting the uplink data. Therefore, the user experience is improved.

The method for transmitting a paging message according to the embodiments of the disclosure is described above in combination with FIG. 2 to FIG. 9 in detail. An access network device according to the embodiments of the disclosure will be described below in combination with FIG. 10 in detail.

Figure 10:
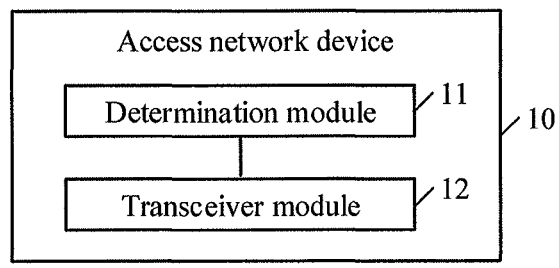
FIG. 10 illustrates a schematic block diagram of an access network device according to an embodiment of the disclosure.

FIG. 10 illustrates a schematic block diagram of an access network device according to an embodiment of the disclosure. As illustrated in FIG. 10, the access network device 10 includes a determination module 11 and a transceiver module 12.

The determination module 11 is configured to determine a paging message.

The determination module 11 is further configured to determine a paging starting moment and a paging transmitting duration.

The transceiver module 12 is configured to transmit the paging message to terminal device in a manner of beam scanning according to the paging starting moment and the paging transmitting duration.

Therefore, the access network device according to the embodiment of the disclosure transmits the paging message to the terminal device in the manner of beam scanning, which may improve the receiving quality of the paging message.

In the embodiment of the disclosure, alternatively, in terms of determining the paging starting moment and the paging transmitting duration, the determination module 11 is specifically configured to determine the paging starting moment and the paging transmitting duration according to a paging cycle of the terminal device.

In the embodiment of the disclosure, alternatively, the paging cycle includes a first period and a second period. The first period is a period in which the terminal device continuously listens for the paging message. The second period is a period in which the terminal device is in a sleep state.

In terms of determining the paging transmitting duration according to the paging cycle of the terminal device, the determination module 11 is specifically configured to determine a value less than or equal to a duration of the first period as the paging transmitting duration.

In the embodiment of the disclosure, alternatively, before the determination module 11 determines the paging starting moment and the paging transmitting duration, the transceiver module 12 is further configured to receive a first message from a core network device, the first message including information configured to indicate the duration of the first period.

In the embodiment of the disclosure, alternatively, the transceiver module 12 is further configured to transmit a second message to the core network device, the second message including the information configured to indicate the duration of the first period.

In the embodiment of the disclosure, alternatively, the paging cycle is N times the duration of the first period, N being a positive integer larger than 1.

In the embodiment of the disclosure, alternatively, before the transceiver module 12 transmits the paging message to the terminal device in the manner of beam scanning according to the paging starting moment and the paging transmitting duration, the determination module 11 is further configured to determine the number of paging beams needed for transmitting of the paging message to be M according to the duration of the first period, M being a positive integer more than or equal to 1.

In the embodiment of the disclosure, alternatively, in terms of transmitting the paging message to the terminal device in the manner of beam scanning according to the paging starting moment and the paging transmitting duration, the transceiver module 12 is specifically configured to start transmitting the paging message to the terminal device at the paging starting moment in the manner of beam scanning by means of L paging beams, any two of the L paging beams corresponding to different paging transmitting durations and L being a positive integer more than or equal to 2.

In the embodiment of the disclosure, alternatively, a value of L is 2, a paging transmitting duration corresponding to one of the two paging beams is a cell-specific continuous listening duration of a cell where the terminal device is located or a preset duration, and a paging transmitting duration corresponding to another of the two paging beams is a terminal device specific continuous listening duration of the terminal device.

In the embodiment of the disclosure, alternatively, the transceiver module 12 is further configured to transmit a system message to the terminal device, the system message including the information configured to indicate the duration of the first period.

In the embodiment of the disclosure, alternatively, the transceiver module 12 is further configured to, when a response message configured to indicate that the paging message is successfully received is received from the terminal device, stop transmitting the paging message to the terminal device.

The access network device according to the embodiment of the disclosure may refer to the flow of the corresponding method for transmitting a paging message 100 of the embodiment of the disclosure and, moreover, each unit/module in the access network device and the other abovementioned operations and/or functions are adopted to implement the corresponding flows in the method 100 respectively and will not be elaborated herein for simplicity.

Figure 11:
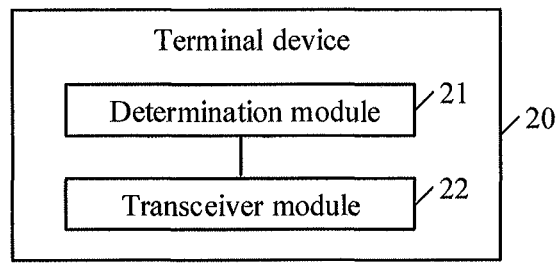
FIG. 11 illustrates a schematic block diagram of a terminal device according to an embodiment of the disclosure.

FIG. 11 illustrates a terminal device according to an embodiment of the disclosure. As illustrated in FIG. 11, the terminal device 20 includes a determination module 21 and a transceiver module 22.

The determination module 21 is configured to determine a paging starting moment and a paging receiving duration.

The transceiver module 22 is configured to receive a paging message according to the paging starting moment and the paging receiving duration.

Therefore, the terminal device according to the embodiment of the disclosure receives the paging message according to the paging starting moment and the paging receiving duration, which may improve the receiving quality of the paging message.

In the embodiment of the disclosure, alternatively, the paging message is transmitted by an access network device in a manner of beam scanning according to the paging starting moment and a paging transmitting duration, and the paging receiving duration is more than or equal to the paging transmitting duration. Since the paging message is transmitted by the access network device in the manner of beam scanning, the receiving quality of the paging message may further be improved.

In the embodiment of the disclosure, alternatively, in terms of determining the paging starting moment and the paging receiving duration, the determination module 21 is specifically configured to determine the paging starting moment and the paging receiving duration according to a paging cycle of the terminal device.

In the embodiment of the disclosure, alternatively, the paging cycle includes a first period and a second period. The first period is a period in which the terminal device continuously listens for the paging message. The second period is a period in which the terminal device is in a sleep state.

In terms of determining the paging receiving duration according to the paging cycle of the terminal device, the determination module 21 is specifically configured to determine a duration of the first period as the paging receiving duration.

In the embodiment of the disclosure, alternatively, in terms of receiving the paging message according to the paging starting moment and the paging receiving duration, the transceiver module 22 is specifically configured to start a first timer at the paging starting moment and simultaneously start continuously listening for the paging message in the first period, a timing period of the first timer being the paging cycle; and in case that the paging message is not heard in the first period, cause the terminal device to enter the sleep state.

The determination module 21 is further configured to, responsive to determining timeout of the first timer, cause the transceiver module 22 to restart continuously listening for the paging message.

In the embodiment of the disclosure, alternatively, in terms of receiving the paging message according to the paging starting moment and the paging receiving duration, the transceiver module 22 is specifically configured to continuously listen for the paging message in the first period from the paging starting moment; and in case that the paging message is not heard in the first period, at an ending moment of the first period, start a second timer, and simultaneously cause the terminal device to enter the sleep state, a timing period of the second timer being a duration of the second period.

The determination module 21 is further configured to, responsive to determining timeout of the second timer, cause the terminal device to restart continuously listening for the paging message.

In the embodiment of the disclosure, alternatively, the paging cycle is N times the duration of the first period, N being a positive integer larger than 1.

In the embodiment of the disclosure, alternatively, the paging message is started to be transmitted by the access network device from the paging starting moment in the manner of beam scanning by means of L paging beams, any two of the L paging beams correspond to different paging transmitting durations, and the duration of the first period is more than or equal to a maximum value of paging transmitting durations corresponding to the L paging beams, L being a positive integer more than or equal to 2.

In the embodiment of the disclosure, alternatively, a value of L is 2, a paging transmitting duration corresponding to one of the two paging beams is a cell-specific continuous listening duration of a cell where the terminal device is located or a preset duration, and a paging transmitting duration corresponding to another of the two paging beams is a terminal device specific continuous listening duration of the terminal device.

In the embodiment of the disclosure, alternatively, the transceiver module 22 is further configured to receive a system message from the access network device, the system message including information configured to indicate the duration of the first period.

In the embodiment of the disclosure, alternatively, the transceiver module 22 is further configured to transmit a response message configured to indicate that the paging message is successfully received to the access network device; and upon receiving an acknowledgment message for the response message from the access network device, start a third timer and simultaneously cause the terminal device to enter the sleep state, or at a moment of K time units after the acknowledgment message is received, start the third timer, and simultaneously cause the terminal device to enter the sleep state, K being a positive integer more than or equal to 1.

The terminal device according to the embodiment of the disclosure may be seen from the flow of the corresponding method for receiving a paging message 200 of the embodiment of the disclosure and, moreover, each unit/module in the terminal device and the other abovementioned operations and/or functions are adopted to implement the corresponding flows in the method 200 respectively and will not be elaborated herein for simplicity.

Figure 12:
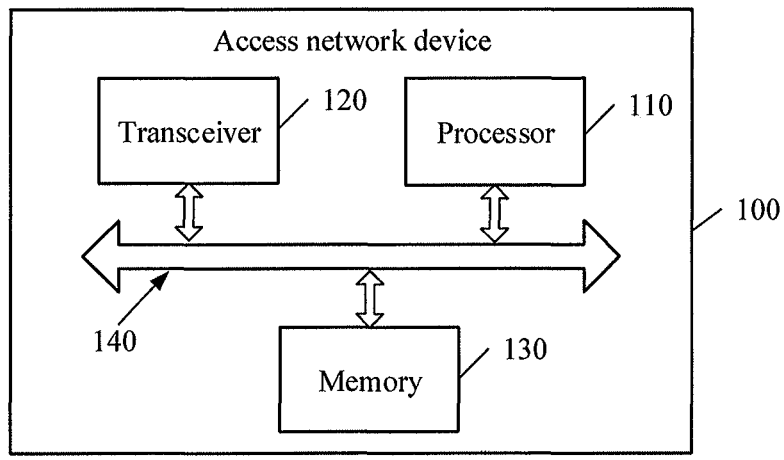
FIG. 12 illustrates a schematic block diagram of an access network device according to another embodiment of the disclosure.

FIG. 12 illustrates an access network device according to another embodiment of the disclosure. As illustrated in FIG. 12, the access network device 100 includes a processor 110 and a transceiver 120. The processor 110 is connected with the transceiver 120. Alternatively, the access network device 100 further includes a memory 130. The memory 130 is connected with the processor 110. Furthermore, the access network device 100 alternatively includes a bus system 140. The processor 110, the memory 130 and the transceiver 120 may be connected through the bus system 140. The memory 130 may be configured to store an instruction. The processor 110 is configured to execute the instruction stored in the memory 130 to control the transceiver 120 to transmit information or receive information. The processor 110 is configured to determine a paging message. The processor 110 is further configured to determine a paging starting moment and a paging transmitting duration. The transceiver 120 is configured to transmit the paging message to a terminal device in a manner of beam scanning according to the paging starting moment and the paging transmitting duration.

Therefore, the access network device according to the embodiment of the disclosure transmits the paging message to the terminal device in the manner of beam scanning, which may improve the receiving quality of the paging message.

It is to be understood that, in the embodiment of the disclosure, the processor 110 may be a Central Processing Unit (CPU) and the processor 110 may also be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 130 may include a Read-Only Memory (ROM) and a Random Access Memory (RAM) and provide instructions and data for the processor 110. A part of the memory 130 may further include a nonvolatile RAM. For example, the memory 130 may further store information of a device type.

The bus system 130 includes a data bus, and may further include a power bus, a control bus, a state signal bus and the like. However, for clear description, various buses in the figure are marked as the bus system 130.

In an implementation process, each operation of the method may be completed by an integrated logic circuit of hardware in the processor 110 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or electrically erasable programmable memory and a register. The storage medium is located in the memory 130. The processor 110 reads information in the memory 130 and completes the operations of the method in combination with hardware. No more detailed descriptions will be made herein to avoid repetitions.

Alternatively, as an embodiment, in terms of determining the paging starting moment and the paging transmitting duration, the processor 110 is specifically configured to determine the paging starting moment and the paging transmitting duration according to a paging cycle of the terminal device.

Alternatively, as an embodiment, the paging cycle includes a first period and a second period. The first period is a period in which the terminal device continuously listens for the paging message. The second period is a period in which the terminal device is in a sleep state.

In terms of determining the paging transmitting duration according to the paging cycle of the terminal device, the processor 110 is specifically configured to determine a value less than or equal to a duration of the first period as the paging transmitting duration.

Alternatively, as an embodiment, before the processor 110 determines the paging starting moment and the paging transmitting duration, the transceiver 120 is further configured to receive a first message from a core network device, the first message including information configured to indicate the duration of the first period.

Alternatively, as an embodiment, the transceiver 120 is further configured to transmit a second message to the core network device, the second message including the information configured to indicate the duration of the first period.

Alternatively, as an embodiment, the paging cycle is N times the duration of the first period, N being a positive integer larger than 1.

Alternatively, as an embodiment, before the transceiver 120 transmits the paging message to the terminal device in the manner of beam scanning according to the paging starting moment and the paging transmitting duration, the processor 110 is further configured to determine the number of paging beams needed for transmitting of the paging message to be M according to the duration of the first period, M being a positive integer more than or equal to 1.

Alternatively, as an embodiment, in terms of transmitting the paging message to the terminal device in the manner of beam scanning according to the paging starting moment and the paging transmitting duration, the transceiver 120 is specifically configured to start transmitting the paging message to the terminal device at the paging starting moment in the manner of beam scanning by means of L paging beams, any two of the L paging beams corresponding to different paging transmitting durations and L being a positive integer more than or equal to 2.

Alternatively, as an embodiment, a value of L may be 2, a paging transmitting duration corresponding to one of the two paging beams is a cell-specific continuous listening duration of a cell where the terminal device is located or a preset duration, and a paging transmitting duration corresponding to another of the two paging beams is a terminal device specific continuous listening duration of the terminal device.

Alternatively, as an embodiment, the transceiver 120 is further configured to transmit a system message to the terminal device, the system message including the information configured to indicate the duration of the first period.

Alternatively, as an embodiment, the transceiver 120 is further configured to, if a response message configured to indicate that the paging message is successfully received is received from the terminal device, stop transmitting the paging message to the terminal device.

The access network device according to the embodiment of the disclosure may refer to the flow of the corresponding method for transmitting a paging message 100 of the embodiment of the disclosure and, moreover, each unit/module in the access network device and the other above-mentioned operations and/or functions are adopted used to implement the corresponding flows in the method 100 respectively and will not be elaborated herein for simplicity.

Figure 13:
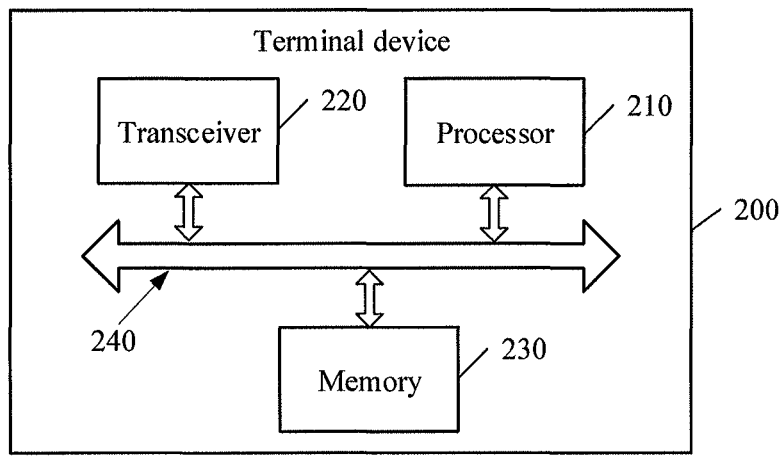
FIG. 13 illustrates a schematic block diagram of a terminal device according to another embodiment of the disclosure.

FIG. 13 illustrates a schematic block diagram of a terminal device according to another embodiment of the disclosure. As illustrated in FIG. 13, the terminal device 200 includes a processor 210 and a transceiver 220. The processor 210 is connected with the transceiver 220. Alternatively, the terminal device 200 further includes a memory 230. The memory 230 is connected with the processor 210. Furthermore, the terminal device 200 alternatively includes a bus system 240. The processor 210, the memory 230 and the transceiver 220 may be connected through the bus system 240. The memory 230 may be configured to store an instruction. The processor 210 is configured to execute the instruction stored in the memory 230 to control the transceiver 220 to transmit information or receive information. The processor 210 is configured to determine a paging starting moment and a paging receiving duration. The transceiver 220 is configured to receive a paging message according to the paging starting moment and the paging receiving duration.

Therefore, in terms of the embodiment of the disclosure, the terminal device receives the paging message according to the paging starting moment and the paging receiving duration, which may improve the receiving quality of the paging message.

It is to be understood that, in the embodiment of the disclosure, the processor 210 may be a CPU and the processor 210 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 230 may include a ROM and a RAM and provides an instruction and data for the processor 210. A part of the memory 230 may further include a nonvolatile RAM. For example, the memory 230 may further store information of a device type.

The bus system 240 includes a data bus, and may further include a power bus, a control bus, a state signal bus and the like. However, for clear description, various buses in the figure are marked as the bus system 240.

In an implementation process, each operation of the method may be completed by an integrated logic circuit of hardware in the processor 210 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a PROM or electrically erasable programmable memory and a register. The storage medium is located in the memory 230. The processor 210 reads information in the memory 230 and completes the operations of the method in combination with hardware. No more detailed descriptions will be made herein to avoid repetitions.

Alternatively, as an embodiment, the paging message is transmitted by an access network device in a manner of beam scanning according to the paging starting moment and a paging transmitting duration, and the paging receiving duration is more than or equal to the paging transmitting duration.

Alternatively, as an embodiment, in terms of determining the paging starting moment and the paging receiving duration, the processor 210 is specifically configured to determine the paging starting moment and the paging receiving duration according to a paging cycle of the terminal device.

Alternatively, as an embodiment, the paging cycle includes a first period and a second period. The first period is a period in which the terminal device continuously listens for the paging message. The second period is a period in which the terminal device is in a sleep state.

In terms of determining the paging receiving duration according to the paging cycle of the terminal device, the processor 210 is specifically configured to determine a duration of the first period as the paging receiving duration.

Alternatively, as an embodiment, in terms of receiving the paging message according to the paging starting moment and the paging receiving duration, the transceiver 220 is specifically configured to start a first timer at the paging starting moment and simultaneously start continuously listening for the paging message in the first period, a timing period of the first timer being the paging cycle; and in case that the paging message is not heard in the first period, cause the terminal device to enter the sleep state.

The processor 210 is further configured to, responsive to determining timeout of the first timer, cause the transceiver 220 to restart continuously listening for the paging message.

Alternatively, as an embodiment, in terms of receiving the paging message according to the paging starting moment and the paging receiving duration, the transceiver 220 is specifically configured to continuously listen for the paging message in the first period from the paging starting moment; and in case that the paging message is not heard in the first period, at an ending moment of the first period, start a second timer, and simultaneously cause the terminal device to enter the sleep state, a timing period of the second timer being a duration of the second period.

The processor 210 is further configured to, responsive to determining timeout of the second timer, cause the terminal device to restart continuously listening for the paging message.

Alternatively, as an embodiment, the paging cycle is N times the duration of the first period, N being a positive integer larger than 1.

Alternatively, as an embodiment, the paging message is started to be transmitted by the access network device from the paging starting moment in the manner of beam scanning by means of L paging beams, any two of the L paging beams correspond to different paging transmitting durations and the duration of the first period is more than or equal to a maximum value of paging transmitting durations corresponding to the L paging beams, L being a positive integer more than or equal to 2.

Alternatively, as an embodiment, a value of L is 2, a paging transmitting duration corresponding to one of the two paging beams is a cell-specific continuous listening duration of a cell where the terminal device is located or a preset duration and a paging transmitting duration corresponding to another of the two paging beams is a terminal device specific continuous listening duration of the terminal device.

Alternatively, as an embodiment, the transceiver 220 is further configured to receive a system message from the access network device, the system message including information configured to indicate the duration of the first period.

Alternatively, as an embodiment, the transceiver 220 is further configured to transmit a response message configured to indicate that the paging message is successfully received to the access network device; and upon receiving an acknowledgment message for the response message from the access network device, start a third timer and simultaneously cause the terminal device to enter the sleep state, or at a moment of K time units after the acknowledgment message is received, start the third timer, and simultaneously cause the terminal device to enter the sleep state, K being a positive integer more than or equal to 1.

The terminal device according to the embodiment of the disclosure may refer to the flow of the corresponding method for receiving a paging message 200 of the embodiment of the disclosure and, moreover, each unit/module in the terminal device and the other abovementioned operations and/or functions are adopted to implement the corresponding flows in the method 200 respectively and will not be elaborated herein for simplicity.

It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the operations and units of each method described in combination with the embodiments disclosed in the disclosure may be implemented by electronic hardware, computer software or a combination of the two. For clearly describing exchangeability of hardware and software, the operations and compositions of each embodiment have been generally described in the foregoing descriptions according to functions. Whether these functions are executed in a hardware or software manner depends on specific applications and design constraints of the technical solutions. Those of ordinary skill in the art may realize the described functions for each specific application by virtue of different methods, but such realization shall fall within the scope of the disclosure.

The methods or operations described in combination with the embodiments disclosed in the disclosure may be implemented by using hardware, a software program executed by the processor or a combination of the two. The software program may be stored in a RAM, a memory, a ROM, an Electrically Programmable Read-Only Memory (EPROM), an Electrically Erasable Programmable Read-Only Memory (EEPROM), a register, a hard disk, a removable disk, a Compact Disc Read-Only Memory (CD-ROM) and a known storage medium in any other form in the technical art.

In some embodiments provided by the application, it is to be understood that the disclosed system, device and method may be implemented in another manner. For example, the device embodiment described above is only schematic, and for example, division of the units is only logic function division, and other division manners may be used during practical implementation. For example, multiple units or components may be combined or integrated into another system, or some characteristics may be neglected or not executed.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

Although the disclosure has been described with reference to the drawings and in combination with the preferred embodiments in detail, the disclosure is not limited thereto.

Those of ordinary skill in the art may make various equivalent modifications or replacements to the embodiments of the disclosure without departing from the spirit and essence of the disclosure. These modifications or replacements shall also fall within the scope of the disclosure.

The invention claimed is:

1. A method for receiving a paging message, comprising:
determining, by a terminal device, a paging starting moment according to a paging cycle of the terminal device and a UE_ID of the terminal device;
determining, by the terminal device, a paging receiving duration of the paging message indicated by information m a system message received from an access network device; and
receiving, by the terminal device, the paging message according to the paging starting moment and the paging receiving duration,
wherein the paging message is transmitted by an access network device through M paging beams in a manner of beam scanning according to the paging starting moment, a duration of the beam scanning is a paging transmitting duration, M is determined by the access network device according to the paging receiving duration, M is a positive integer larger than 1, the paging transmitting duration is smaller than the paging receiving duration, and the paging receiving duration is a duration of a period in which the terminal device continuously listens for the paging message;
wherein the paging cycle comprises a first period and a second period, the first period is the period in which the terminal device continuously listens for the paging message, the second period is a period in which the terminal device is in a sleep state, and
wherein the paging cycle is times the duration of the first period, N being a positive integer larger than 1;
wherein receiving, by the terminal device, the pacing message according to the pacing starting moment and the pacing receiving, duration comprises:
continuously listening by the terminal device, for the paging message in the first period from the paging starting moment;
in case that the pacing message is not heard by the terminal device in the first period, at an ending moment of the first period, starting, by the terminal device, a second timer and simultaneously entering, by the terminal device, the sleep state, a timing period of the second timer being a duration of the second period; and
responsive to determining, by the terminal device, timeout of the second timer, restarting continuously listening, by the terminal device, for the paging message.

2. The method of claim 1, wherein the paging message is started, from the paging starting moment, to be transmitted by the access network device in the manner of beam scanning by means of L paging beams, any two of the L paging beams correspond to different paging transmitting durations, and the duration of the first period is more than or equal to a maximum value of paging transmitting durations corresponding to the L paging beams, L being a positive integer more than or equal to 2.

3. The method of claim 2, wherein a value of L is 2, a paging transmitting duration corresponding to one of the two paging beams is a cell-specific continuous listening duration of a cell where the terminal device is located or a preset duration, and a paging transmitting duration corresponding to another of the two paging beams is a terminal device specific continuous listening duration of the terminal device.

4. The method according to claim 1, further comprising:
transmitting, by the terminal device, a response message configured to indicate that the paging message is successfully received, to the access network device; and
when the terminal device receives an acknowledgment message for the response message from the access network device, starting, by the terminal device, a third timer, and simultaneously entering, by the terminal device, the sleep state; or, at a moment of K time units after the acknowledgment message is received, starting, by the terminal device, the third timer, and simultaneously entering, by the terminal device, the sleep state, K being a positive integer more than or equal to 1.

5. The method of claim 1, wherein determining, by the terminal device, the paging starting moment according to the paging cycle of the terminal device comprises:
determining, by the terminal device, the paging starting moment by using the following formula:

$$\text{SFN mod } T = (T \text{ div } N) * (UE\_ID \text{ mod } N)$$

where SFN is system frame number, which is a frame number of a radio frame where the terminal device is presently located, T is the paging cycle of the terminal device, N: N=min(T, nB), nB is a paging density, UE_ID is included in the paging message, div is a division operation, and mod is a remainder calculation operation.

6. A terminal device, comprising:
a processor;
a memory storing instructions, which, when executed by the processor, cause the processor to implement one or more actions, comprising: determining a paging starting moment according to a paging cycle of the terminal device and a UE_ID of the terminal device, and determining a paging receiving duration of a paging message indicated by information in a system message received from an access network device; and
a transceiver, configured to receive the paging message according to the paging starting moment and the paging receiving duration,
wherein the paging message is transmitted by an access network device through M paging beams in a manner of beam, scanning according to the paging starting moment, a duration of the beam scanning is a paging transmitting duration, M is determined by the access network device according to the paging receiving duration, M is a positive integer larger than 1, the paging transmitting duration is smaller than the paging receiving duration, and the paging receiving duration is a duration of a period in which the terminal device continuously listens for the paging message;
wherein the paging cycle comprises a first period and a second period, the first period is the period in which the terminal device continuously listens for the paging message, the second period is a period in which the terminal device is in a sleep state, and
wherein the paging cycle is N times the duration of the first period, N being a Positive integer larger than 1;
wherein, in terms of receiving the paging message according to the paging starting moment and the paging receiving duration, the transceiver is configured to:
continuously listen for the paging message in the first period from the paging starting moment; and in case that the paging message is not heard in the first period, at an ending moment of the first period, start a second timer, and simultaneously cause the terminal device to enter the sleep state, a timing period of the second timer being a duration of the second period, wherein the one or more actions further comprise: responsive to determining timeout of the second timer, causing the terminal device to restart continuously listening for the paging message.

7. The terminal device of claim 6, wherein the transceiver is further configured to:

transmit a response message, configured to indicate that the paging message is successfully received, to the access network device; and upon receiving an acknowledgment message for the response message from the access network device, start a third timer, and simultaneously cause the terminal device to enter the sleep state; or at a moment of K time units after the acknowledgment message is received, start the third timer, and simultaneously cause the terminal device to enter the sleep state, K being a positive integer more than or equal to 1.

8. The terminal device of claim 6, wherein determining the paging starting moment according to the paging cycle of the terminal device comprises:

determining the paging starting moment by using the following formula:

$$\text{SFN mod } T = (T \text{ div } N) * (UE\_ID \text{ mod } N)$$

where SFN is system frame number, which is a frame number of a radio frame where the terminal device is presently located, T is the paging cycle of the terminal device, N: N=min(T, nB), nB is a paging density, UE_UD is included in the paging message, div is a division operation, and mod is a remainder calculation operation.

9. A terminal device, comprising:

a processor;

a memory storing instructions which, when executed by the processor, cause the processor to implement one or more actions comprising determining a paging starting moment and a paging receiving duration of a paging message according, to a paging cycle of the terminal device; and a transceiver, configured to receive the paging message according to the paging starting moment and the paging receiving duration, wherein the paging cycle comprises a first period and a second period, the first period is a period in which the terminal device continuously listens for the paging message, the second period is a period in which the terminal device is in a sleep state, and wherein determining the paging receiving duration according to the paging cycle of the terminal device comprises: determining a duration of the first period as the paging receiving duration;

wherein the paging message is started to be transmitted by the access network device from the paging starting moment in the manner of beam scanning by means of L paging beams, any two of the L paging beams correspond to different paging transmitting durations, and the duration of the first period is more than or equal to a maximum value of paging transmitting durations corresponding to the L paging beams, L being a positive integer more than or equal to 2.

10. The terminal device of claim 9, wherein a value of L is 2, a paging transmitting duration corresponding to one of the two paging beams is a cell-specific continuous listening duration of a cell where the terminal device is located or a preset duration, and a paging transmitting duration corresponding to another of the two paging beams is a terminal device specific continuous listening duration of the terminal device.

* * * * *